May 27, 1969
L. W. WELLS
3,446,448
FILM REEL DRIVE ASSEMBLY
Filed March 27, 1967
Sheet 1 of 2
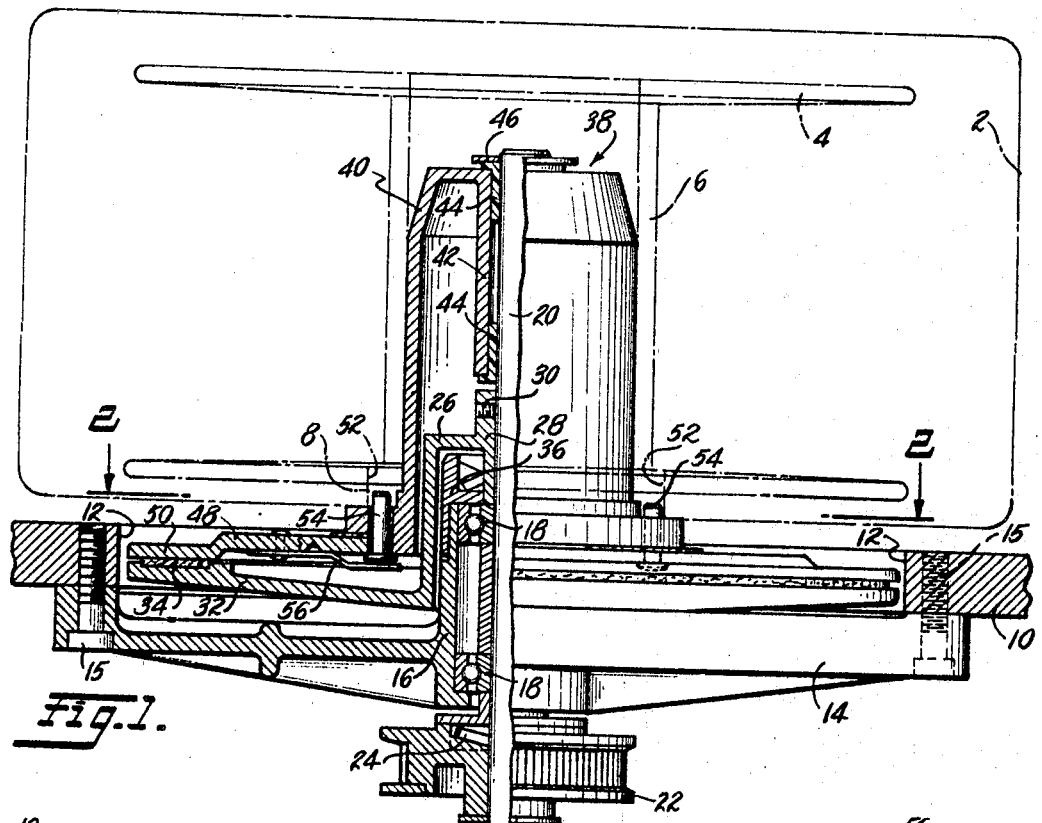
*Fig. 1.*
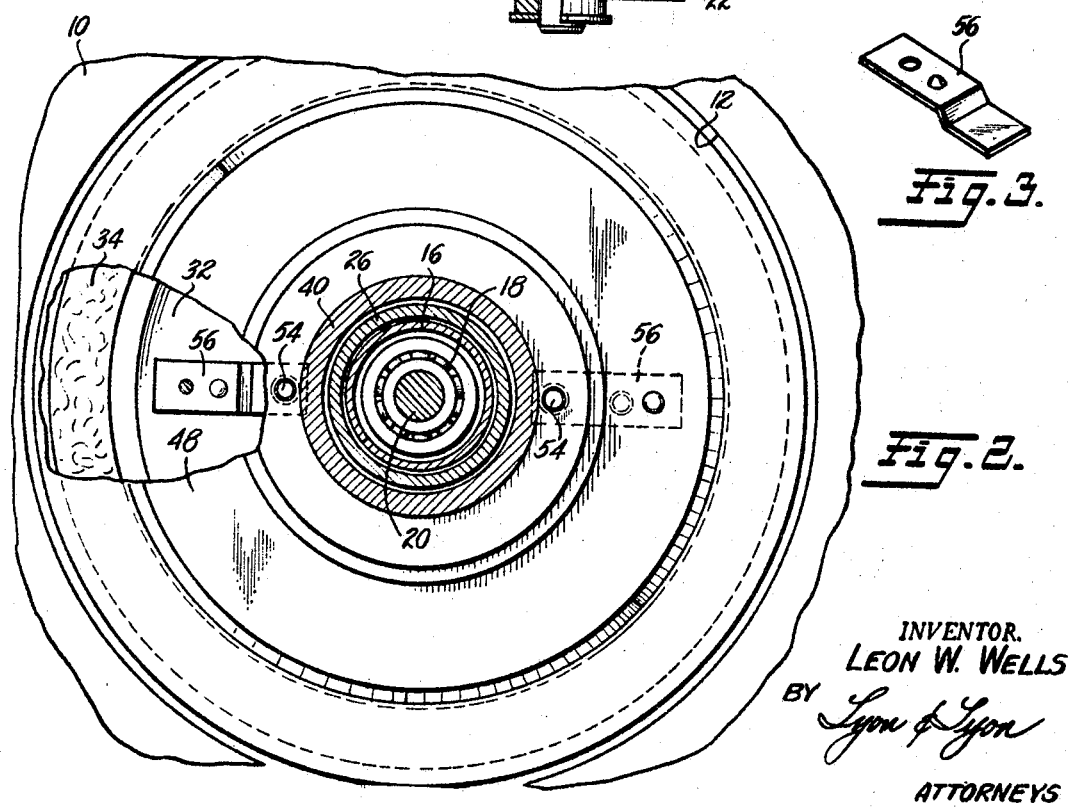
*Fig. 3.*
*Fig. 2.*
INVENTOR.
LEON W. WELLS
BY Lyon & Lyon
ATTORNEYS INVENTOR.
LEON W. WELLS
BY Lyon & Lyon
ATTORNEYS

United States Patent Office 3,446,448
Patented May 27, 1969

3,446,448
FILM REEL DRIVE ASSEMBLY
Leon W. Wells, Closter, N.J., assignor to Panopix Research Inc., New York, N.Y., a corporation of New York
Filed Mar. 27, 1967, Ser. No. 626,290
Int. Cl. G11b *15/44;* B65h *75/30, 79/00*
U.S. Cl. 242—55.14                                    7 Claims

ABSTRACT OF THE DISCLOSURE

Control means for a film reel serving alternately as a supply reel and take-up reel, the reel being frictionally connected to a control member which can be rotated in only one direction, for winding film on the reel and which cannot rotate in the other direction and thus acts as a restraint frictionally resisting forcible rotation of the reel in an unwinding direction. The frictional connection also serving as the sole vertical support for the reel and film and thus maintains substantially constant tension in the film irrespective of film diameter.

Cross references to related applications

This application describes improvements in certain features of a film projector as described in my application Ser. No. 541,196, filed Apr. 8, 1966, for Improved Motion Picture Projector. The present improvements relate to a machine of the type shown in the above-noted prior application when adapted for use with an improved film cartridge, as shown and described in my application Ser. No. 621,259, filed Mar. 7, 1967.

Background of the invention

This invention relates to the control of a film reel in a motion picture projector or the like and particularly in a projector where the film is alternately run in opposite directions whereby the same reel serves alternately as a supply reel and a take-up reel. When it functions as a supply reel, a restraint must be applied to its rotation to apply tension to the film being withdrawn therefrom and when its functions as a takeup reel, it must be driven in rotation in such a manner as to apply tension to the film being wound thereon. While the description herein and the preferred embodiment relates to reels functioning alternately as supply reels and takeup reels, the invention is equally adaptable to reels in more or less conventional projectors and the like where each reel functions only as a supply reel or a takeup reel.

In the reeling and handling of film in a projector or like machine, and particularly film having sound recorded thereon, it is essential that at least certain portions of the film be transported through the apparatus at a uniform and unvarying speed. To accomplish this it is necessary that uniform tension be applied to the film at all times, at the supply and takup reels. Heretofore it has been customary to drive each reel through a slip-drive, such as a coil spring functioning as a belt, to accommodate for changing diameter of the film on the reel. Customarily such reels are driven at substantially constant torque but with provision for slippage between the drive means and the reel. The application of constant torque to such a drive results in a constant variation in the tension applied to the film because of the changing diameter of the roll of film being wound onto or unwound from the reel.

Summary of the invention

The present invention comprises a reel driving mechanism including a one-way clutch to drive the reel in one direction when the reel is serving as a takeup reel. The drive is applied to an intermediate friction member that only frictionally engages the reel or its drive means and is so arranged that the friction surface supports the weight of the reel and film thereon so that the amount of torque transmitted through the friction surface is proportional to the pressure on that friction surface, which in turn varies in accordance with the weight of film on the reel. Thus, as the diameter of the film roll on the reel increases, its weight also increases and applies greater pressure to the described frictional connection with the intermediate member and thus greater torque is transmitted to the reel, to maintain a substantially uniform tension in the film being wound even though that tension is applied at a greater distance from the center of rotation. A further feature of the invention resides in the provision of one-way brake means between the intermediate member and a supporting frame whereby the member and reel can be driven only in one direction of rotation. When the reel is forcibly rotated in the other direction, such as when film is being withdrawn therefrom, the intermediate member acts as a brake to restrain rotation of the film and as already described, the restraint varies in accordance with the weight of film on the roll and thus a substantially constant tension is applied to the film even though it is applied at a changing radius.

Brief description of the drawings

FIG. 1 is a fragmentary elevational view partly in section showing the reel drive of the present invention with a film cartridge case and reel therein shown in phantom lines;

FIG. 2 is a fragmentary horizontal sectional view taken on the line 2—2 of FIG. 1;

FIG. 3 is a perspective view of one of the drive finger springs associated with the reel drive device;

Description of the preferred embodiments

Figure 4:
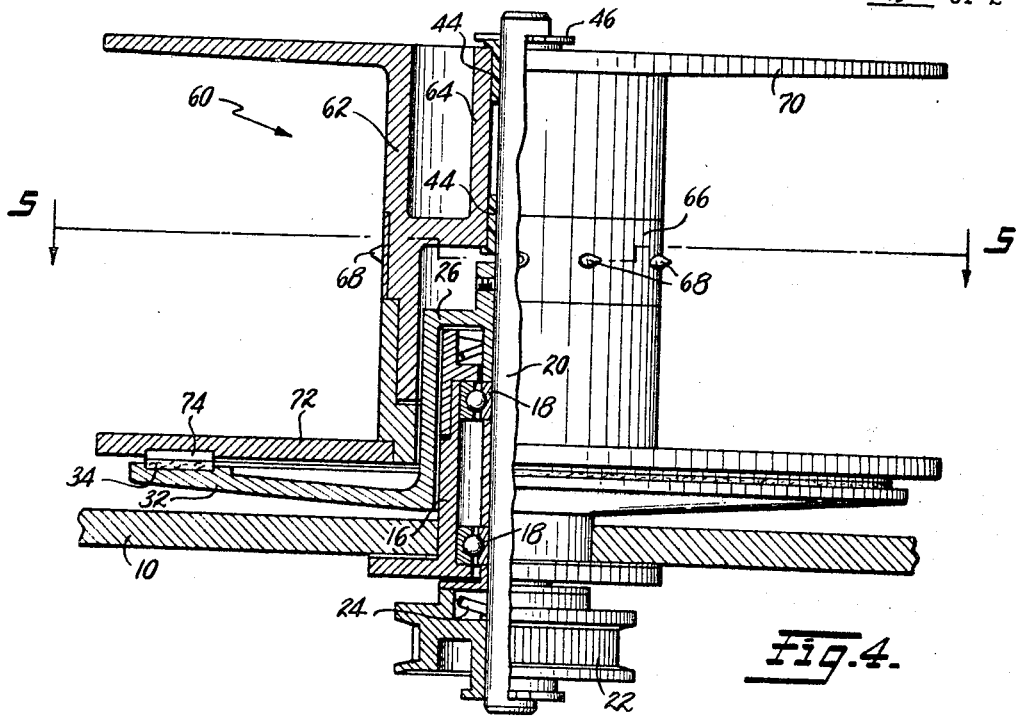
FIG. 4 is a fragmentary elevational view, partly in section, showing the takeup reel of the present invention.
Figure 5:
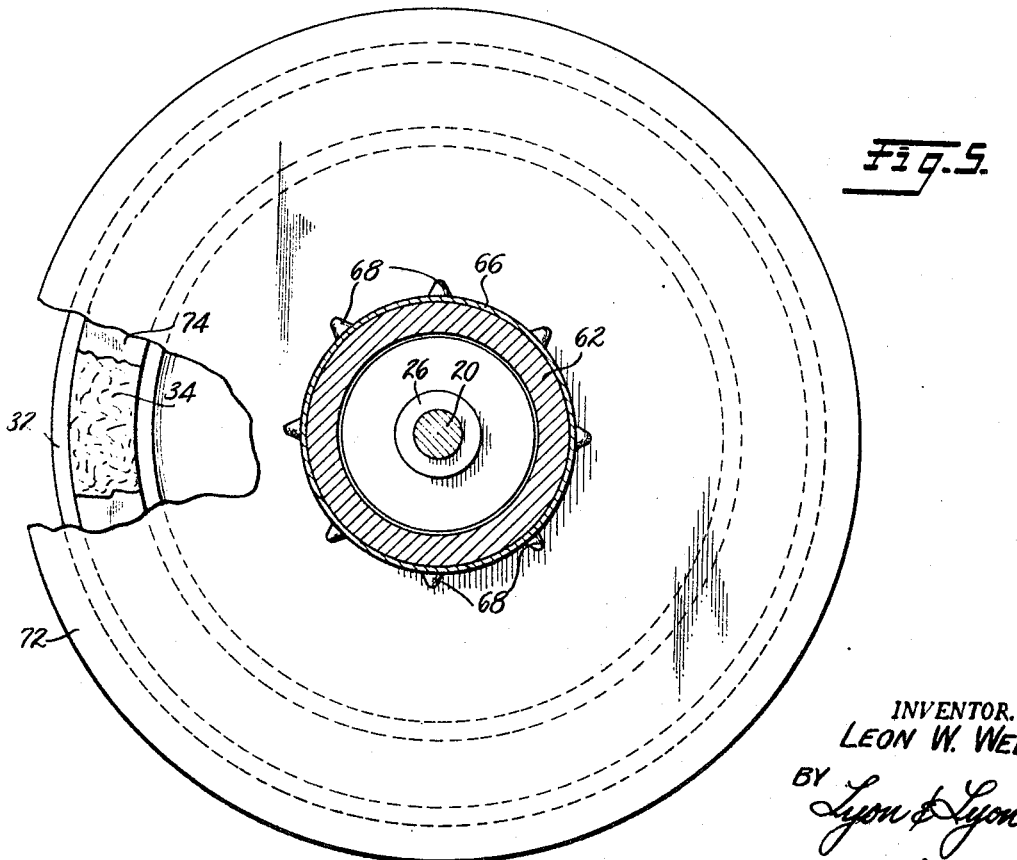
FIG. 5 is a fragmentary horizontal sectional view taken on the line 5—5 of FIG. 4.

FIG. 1 illustrates an embodiment of reel drive and control means for use with a projector of the type described in my prior application Ser. No. 541,196 and particularly with the improved film cartridge shown in my application Ser. No. 621,259. In the last mentioned application, a removable film cartridge is disclosed having a reel of film housed therein for rotation. The cartridge is shown by phantom lines in FIG. 1 at 2. The reel in the cartridge is shown in phantom line at 4 and includes a hollow tubular hub member 6, the hollow center of which is aligned with an opening 8 in the lower wall or bottom of the cartridge.

As shown in my application Ser. No. 541,196, the projector is adapted to project film comprising a multiplicity of longitudinal rows of picture frames. One row is projected while the film is moving in one longitudinal direction and thereafter a subsequent row of frames is projected by reversing the direction of film movement and by moving the film transport means in a direction lateral to the length of the film. The transport means is moved in that lateral direction by being supported on a vertically movable platform operated and controlled by the mechanisms described in the prior application referred to. In FIG. 1 of the present case, numeral 10 indicates the vertically movable platform referred to. As shown, the platform 10 is provided with an opening 12 below which a suitable support frame 14 is fixedly mounted by screws 15 and provided with a bearing sleeve 16. Suitable bearings 18 are provided in sleeve 16 and rotatably support a vertical shaft 20. A drive pulley 22 is rotatably mounted on the shaft 20 and is drivingly connected thereto through a suitable one-way clutch 24 whereby the pulley can drive shaft 20 in only one direction of rotation, for example, counterclockwise as viewed from the bottom of FIG. 1. In operation of the machine, the pulley 22 is alternately driven in opposite directions, depending upon that portion of the projection cycle in which the machine is operating. When the pulley 20 is rotating in the one direction, it positively drives shaft 20 which in turn will drive reel 4 in a direction to wind film thereon. When the pulley 20 is rotated in the opposite direction, the one-way clutch 24 releases and it applies no torque to the shaft 20 and thus the latter can be held against rotation, in a manner to be described. Fixed to the shaft 20 is an intermediate member 26 comprising a hub portion 28 fixed to the shaft 20 by a set screw 30 or the like and having a radially extending disc or flange portion 32 provided at its outer periphery with an annular friction member 34. The hub portion 28 of the intermediate member 26 is connected to the stationary support member 16 through a one-way brake device 36 whereby to permit rotation of the disc 32 with shaft 20 when the latter is being driven by pulley 22 through one-way clutch 24. However, the one-way brake 36 prevents rotation of the disc 32 in the opposite direction so that when pulley 22 is rotating in the opposite direction, it is not only incapable of driving the shaft 20 but the latter and intermediate member 26 are positively held against rotation in such reverse direction.

A driving device 38 is provided with a hub portion 40 including central sleeve 42. The sleeve 42 is provided with internal bearing sleeves 44 whereby the driving device is rotatably mounted on the shaft 20. It is to be noted that, while means 46 hold the driving device in assembled relation to shaft 20 and prevent excessive upward movement thereon, the driving device is free to slide downwardly on the shaft 20 a limited distance. The hub portion 40 of the driving device is of a size to be readily received within the hub 6 of the reel 4. The driving device also includes a flange or disc 48 at the lower end thereof overlying the disc 32 of the intermediate member and is provided with an annular portion 50 frictionally resting on the friction material 34. Thus, the entire driving device 38 frictionally engages the intermediate member 26 and is completely supported thereby in a vertical direction.

As described in my prior application, directed to the improved film cartridge, the reel 4 is provided with driving notches or the like 52. The flange portion 48 of the driving device 38 is provided with upwardly extending pins 54 slidably mounted therein and urged upwardly by leaf springs 56. The pins 54 thus constitute a driving connection between the driving device 38 and the reel 4 when cartridge 2 is placed in position on the projection machine. In the event the cartridge is placed on the machine with the reel 4 so oriented that the notches 42 are not aligned with pins 54, the weight of the reel and cartridge will depress the pins downwardly against the action of springs 56 and subsequent rotation of the driving device 38 will bring the pins and notches into alignment whereupon the pins will move upwardly and automatically effect driving engagement with the reel.

As previously mentioned, the friction material 34 constitutes the sole vertical support for the driving device 38 and since the latter also supports the reel 4 and any film thereon, the pressure between flange portion 50 and material 34 varies with change in the diameter of the roll of film on reel 4. As is well known, the force transmitted between frictionally engaging surfaces is dependent on the coefficient of friction of the engaged members, which is a constant, and the pressure applied across the interengaging faces, which in this case is variable. When the pulley 22 is driven in such direction as to drive shaft 20 and flange 32, the tangential forces applied to the driving member 38 and hence to the reel 4 is dependent on the pressure between portion 50 and material 34. Assuming the roll of film on reel 4 to be at its minimum diameter, the weight of the reel is then at a minimum and relatively low pressure is applied to the friction connection. Thus, low torque is transmitted to the reel, the film extending tangentially therefrom at a short radius, the low torque transmitted will result in a predetermined tension being applied to the film through a short moment arm. Clearly, the larger the reel of film, the more it will weigh and hence, the greater will be the torque transmitted to the reel and, with the resulting increase in radius or moment arm, the tension applied to the film will remain substantially constant. The particular material 34, its diameter and position in the mechanism can be predesigned with relation to the particular film contemplated so that substantially constant tension is applied to the film at all times.

When pulley 22 is being rotated by the drive means, not shown, in a reverse direction, it is incapable of applying torque to the shaft 20 because of the presence of the one-way clutch 24. This reverse drive of the pulley occurs when the reel 4 is functioning as a supply reel and film is being withdrawn therefrom, thus forcibly rotating reel 4 in the reverse direction. Under those conditions the reel 4 and driving device 38 can be forcibly rotated by film withdrawal in such reverse direction since the portion 50 can slip on the material 34. However, the disc 32 cannot be rotated in such reverse direction because of the presence of the one-way brake device 36. It will be obvious that the tension applied to the film necessary to cause slippage between the frictionally engaged parts will vary in accordance with the weight on the material 34 which in turn is dependent on the diameter of the reel of film at that time. Obviously, the diameter of the roll of film and the weight thereof decrease as film is withdrawn and less torque is necessary to cause the described slippage. However, the tension on the film is applied to the reel at a decreasing radius so that constant tension will result in a proper decrease in the torque applied to the driving device.

In a machine of the type described in application Ser. No. 541,196, the platform 10 is also provided with a film takeup reel permanently mounted thereon. When a cartridge of film is placed on the machine and a cycle of operation commenced, the machine automatically withdraws film from the reel 4, threads it through the machine past a projection device and directs it onto a takeup reel indicated generally in FIG. 4 by numeral 60. After the film is threaded in the machine, the reels 4 and 60 function alternately as supply reels and takeup reels upon reversal of film drive as described in the prior application.

In FIG. 4, many of the parts are identical to those shown and described with reference to FIG. 1 and are identified by the same reference numerals. Those parts will not be redescribed at this time except to point out that the bearing supporting sleeve 16 is mounted directly on the platform 10 rather than on a supporting structure, such as member 14 of FIG. 1. The pulley 22 of FIG. 4 is likewise connected to shaft 20 through a one-way clutch 24 and the shaft 20 is supported by bearings 18 in sleeve 16. Intermediate member 26 is identical to the corresponding member of FIG. 1 and is fixed to the shaft 20 in the same manner. In this embodiment, however, the driving device 38 of FIG. 1 is omitted. The reel 60 comprises a cylindrical hub portion 62 having a central sleeve 64 therein corresponding to the sleeve portion 42 of FIG. 1 and also provided with the sleeve bearings 44 rotatably supporting the reel 60 on shaft 20 but permitting downward vertical movement thereon. The outer surface of the hub 62 is provided with a band 66 having radial projections 68 thereon for the purpose of engaging the leading end of a film during automatic threading thereof in the machine, all as described in application Ser. No. 541,196.

The reel 60 is also provided with an upper flange 70 and a lower flange 72 corresponding in function to the flange or disc 48 of FIG. 1 but in this embodiment the flange is part of the reel itself rather than part of a separate drive device. The flange 72 is provided with an annulus 74 of friction material having a downwardly facing surface opposite to and engaging the upwardly facing surface of the material 34 to define a friction drive connection between the disc 32 and flange 72. As will be apparent, the entire weight of the reel 60 and any film wound thereon is supported by the material 34 whereby the torque that can be transmitted to that frictional connection without causing slippage thereof is dependent on the weight of film on the reel and, therefore, varies in accordance with the diameter of the film roll.

It is not deemed necessary to redescribe the operation of this embodiment since it is identical in result to the operation of the form shown in FIG. 1 and will likewise ensure substantially constant tension in the film being wound onto or withdrawn from the reel 60 in the same manner as already described.

While FIG. 1 shows friction material 34 only on flange 32 and not on portion 50 of flange 48, clearly a second body of friction material could be provided on flange 48 if desired, similar to the arrangement shown in FIG. 4. Likewise, if desired, the material 74 of FIG. 4 could be eliminated and material 34 could directly engage a surface of flange 72 itself.

While a single embodiment of each reel is shown and described herein, it is to be understood that the same is merely illustrative of the principles involved and that other embodiments may be resorted to within the scope of the appended claims.

I claim:

1. In a reel drive mechanism: a support; a shaft journalled on said support; reversible drive means; a one-way drive connection between said drive means and said shaft whereby said drive means can drive said shaft in only one direction of rotation; a friction member fixed to said shaft; a one-way brake device between said friction member and said support permitting rotation of said shaft and friction member in only said one direction of rotation; a hub freely journalled on said shaft and frictionally engaging said friction member to be frictionally driven thereby when said shaft is rotated in said one direction and to be frictionally restrained thereby when said hub is forcibly rotated in the other direction of rotation.

2. A reel drive mechanism as defined in claim 1 wherein said shaft is substantially vertical; said friction member having an upwardly facing first friction surface thereon; said hub member having a downwardly facing second friction surface engaging said first friction surface and supporting said hub member thereon whereby torque transmitted between said friction surfaces is proportional to the weight on said hub member.

3. A reel drive mechanism as defined in claim 1 wherein said hub member comprises the hub portion of a film reel, said reel having a bottom flange provided with a friction surface thereon engaging an opposed friction surface on said friction member.

4. A reel drive mechanism as defined in claim 1 wherein said hub member is provided with means for drivingly engaging and removably supporting a film reel thereon in substantially concentric relation to said shaft.

5. In a film reel drive mechanism: rotatable shaft means mounted for rotation about a substantially vertical axis; a member on said shaft defining an upwardly facing first friction surface; one-way brake means engaging said member and permitting rotation thereof about said axis in only one direction; support means rotatable about said shaft and being freely axially movable downwardly for supporting a roll of film for winding and unwinding rotation about said axis, said support means having a downwardly facing second friction surface resting on said first friction surface to support the weight of said roll of film thereon so that the torque transmitted between said surfaces is dependent on the weight of said roll of film whereby to maintain film extending tangentially from said roll under substantially constant tension irrespective of the diameter of said roll.

6. Film tension control means comprising: support means rotatable about and movable along a generally vertical axis for supporting a roll of film for rotation about said axis; said support means having a downwardly facing first friction surface; a control member for controlling rotation of said support means about said axis, said control member having an upwardly facing second friction surface engaging said first friction surface and constituting the sole vertical support and rotational control for said support means and any film thereon; whereby the maximum tension that can be applied to film extending tangentially from said roll, in winding the film onto the roll support means is substantially constant irrespective of the diameter of said roll; and one-way brake means for preventing rotation of said control member in the direction for unwinding the film whereby a substantially constant tension is applied to the film as it unwinds tangentially from said roll.

7. Film tension control means as defined in claim 6 including means for rotating said control member about said axis in a direction to wind film on said roll.

References Cited

UNITED STATES PATENTS 2,702,834   2/1955   Golle et al. _____ 179—100.2
2,712,369   7/1955   Schroter _____ 192—4

LEONARD D. CHRISTIAN, Primary Examiner.

U.S. Cl. X.R.

242—46.2